United States Patent [19]
Sato et al.

[11] Patent Number: 5,351,312
[45] Date of Patent: Sep. 27, 1994

[54] SPATIAL FILTER OF AN IMAGE SIGNAL PROCESSOR PROVIDING ALTERNATING LINE IMAGES WITHOUT MOIRE

[75] Inventors: Shinichi Sato, Yokohama; Kazuto Kobayashi, Tokyo, both of Japan

[73] Assignee: Matsushita Graphic Communication Systems, Inc., Tokyo, Japan

[21] Appl. No.: 109,113

[22] Filed: Aug. 19, 1993

Related U.S. Application Data

[63] Continuation of Ser. No. 767,719, Sep. 30, 1991, abandoned.

[30] Foreign Application Priority Data

Oct. 9, 1990 [JP]  Japan .................................. 2-271145
Oct. 9, 1990 [JP]  Japan .................................. 2-271146

[51] Int. Cl.[5] ..................... G06K 9/36; G06K 9/38; G06K 9/40
[52] U.S. Cl. ........................................ 382/50; 382/54
[58] Field of Search .................... 382/41, 50, 54; 358/456, 458, 459, 463; G06K 9/36, 9/38, 9/40; H04N 1/04, 1/40

[56] References Cited

U.S. PATENT DOCUMENTS

| | | | |
|---|---|---|---|
| 4,356,555 | 10/1982 | Ejiri et al. | 382/54 |
| 4,399,461 | 8/1983 | Powell | 382/54 |
| 4,924,509 | 5/1990 | Yokomizo | 382/50 |

*Primary Examiner*—Jose L. Couso
*Attorney, Agent, or Firm*—Lowe, Price, LeBlanc & Becker

[57] ABSTRACT

An error distribution type image signal processor has a spatial filter which has a positive filter coefficient assigned to pixels adjoining a pixel of interest in main and sub scan directions and a negative filter coefficient assigned to pixels adjoining the pixel of interest in diagonal directions. The sum of a filter coefficient for the pixel of interest and the filter coefficients for the pixels adjoining it is unity. Therefore, high frequency image signals of the pixels adjoining the pixel of interest in the diagonal directions are attenuated, and high frequency image signals of the pixels adjoining the pixel of interest in the main and sub scan directions are amplified. Accordingly, amplitudes of the pixels adjoining the pixel of interest in the diagonal directions are minimal, so that an image of the pixel of interest is clarified and emphasized.

6 Claims, 12 Drawing Sheets

| O | −A (a) | O |
|---|---|---|
| −A (b) | 1+4·A (p) | −A (d) |
| O | −A (c) | O |

FIG. 6(a) PRIOR ART
INPUT IMAGE DATA SIGNAL

MULTI LEVEL ($f_{mn}$)

$\Sigma f_{mn} = 50 \ (\%)$

FIG. 6(b) PRIOR ART
BINARIZED SIGNAL

BINARY LEVEL ($g_{mn}$)

$\Sigma g_{mn} = 50 \ (\%)$

FIG. 6(c) PRIOR ART
RECORDED IMAGE $\Sigma g_{mn} = 40 \ (\%)$

FIG. 7(a) PRIOR ART $\Sigma g_{mn} = 40 \ (\%)$

FIG. 7(b) PRIOR ART $\Sigma g_{mn} = 45 \ (\%)$

| -B  | A   | -B  |
|-----|-----|-----|
| (b) | (c) | (d) |
| A   | 1+4B-4A | A |
| (a) | (p) | (h) |
| -B  | A   | -B  |
| (e) | (f) | (g) |

B : BLACK
W : WHITE

FIG. 13

B : BLACK
W : WHITE

SPATIAL FILTER OF AN IMAGE SIGNAL PROCESSOR PROVIDING ALTERNATING LINE IMAGES WITHOUT MOIRE

This application is a continuation of U.S. patent application Ser. No. 07/767,719 filed Sep. 30, 1991 now abandoned.

BACKGROUND OF THE INVENTION

1. Field of the Invention

The present invention relates to an image signal processor used in facsimiles and scanners.

2. Description of the Prior Art

In conventional apparatuses of this kind, the objects to be processed are primarily characters and the size of a dot in a recording system is set slightly larger than the size of a corresponding theoretical picture element or pixel to reproduce smooth characters in continuous lines.

Figure 1:
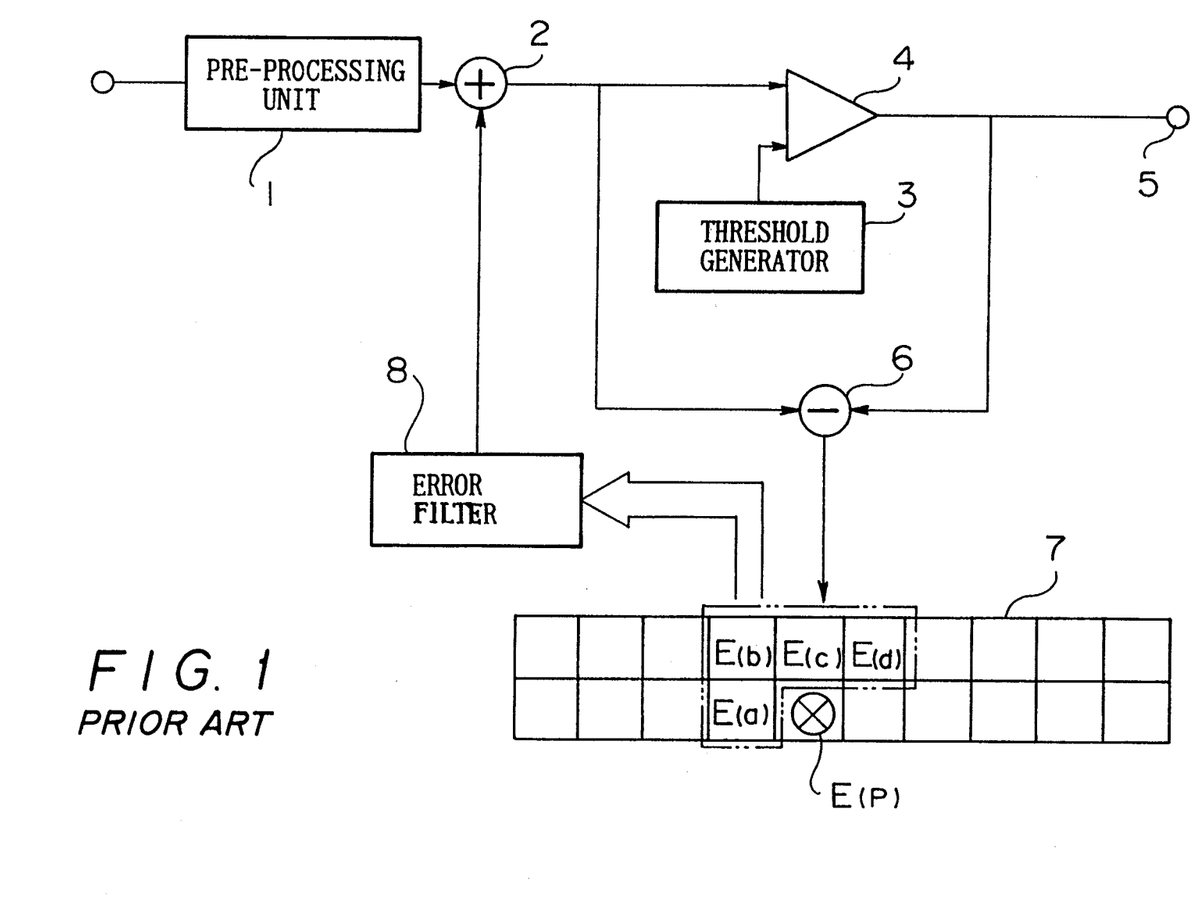
FIG. 1 is a block diagram showing the outline configuration of a conventional image signal processor.

FIG. 1 shows the outline configuration of the conventional image signal processor. In the figure, reference numeral 1 represents a preprocessor which receives image information, in a multiple level, on a text image divided into component pixels by a scanner and which performs preprocessing on the image information received. Denoted 2 is an adder that adds up the image signal fed from the input terminal 1 and an output from an error filter described later. A threshold generator 3 produces a threshold value used in binarizing the output of the adder 2, i.e., transforming it into a binary signal. A comparator 4 converts the output of the adder 2 into a binary signal according to the threshold value generated by the threshold generator 3. The binary signal of the comparator 4 is sent out from an output terminal 5. A subtractor 6 subtracts the output of the comparator 4 from the output of the adder 2. An error data memory 7 stores the output of the subtractor d as error data. An error filter 8 assigns weight to each of the error data for the binarized signals of pixels adjoining the pixel of interest and sums up the weighted error data.

The preprocessor 1 consists of a Laplacean space filter and corrects the input image signal to make the image sharp.

Figure 2:
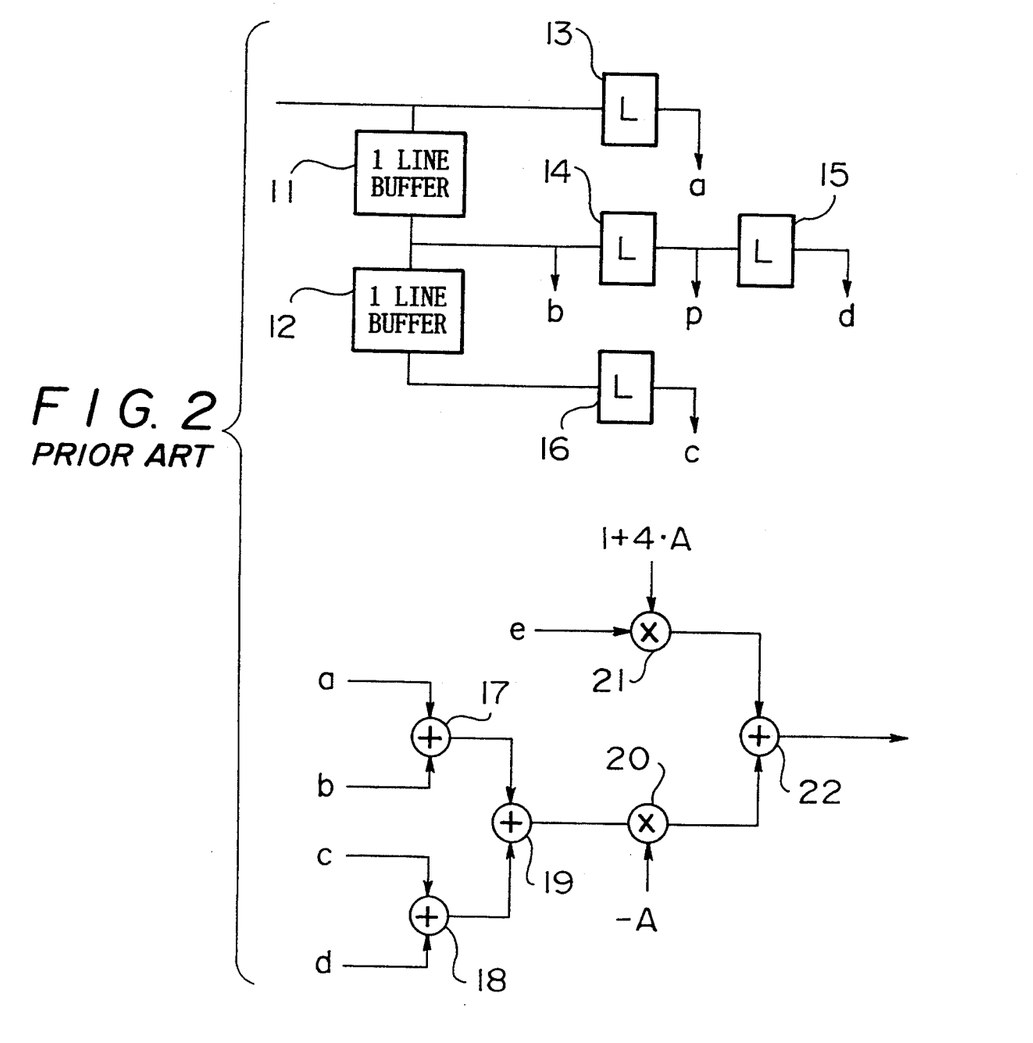
FIG. 2 is a diagram showing the outline configuration of a conventional Laplacean filter used in the image signal processor of FIG. 1.
Figure 3:
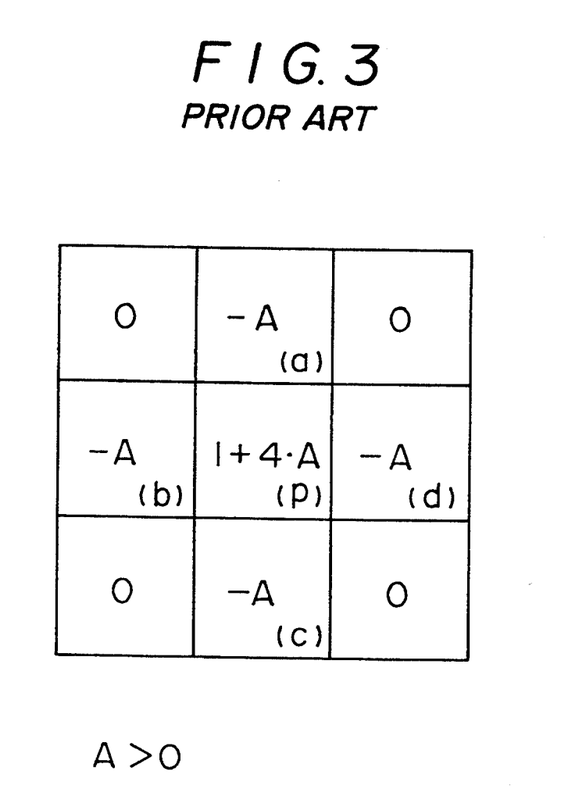
FIG. 3 is a diagram showing coefficients of the conventional Laplacean filter.

FIG. 2 shows the outline configuration of the preprocessor 1 in the conventional image signal processor. FIG. 3 shows a matrix indicating the coefficients of the filter.

In FIG. 2, reference numerals 11, 12 indicate one-line buffers that store image information of one line in the main scan direction. Designated 14, 15, 16 are latch circuits that output image information on pixels p, d, c in the matrix of FIG. 3 out of the image information stored in the one-line buffers 11, 12. Denoted 13 is a latch circuit that generates image information of the pixel a in the matrix. Adders 17, 18, 19 add information of pixels adjoining the pixel of interest in the matrix. A multiplier 20 multiplies with a negative coefficient the result of addition of the surrounding pixels obtained from the three adders. A multiplier 21 multiplies the pixel of interest, i.e., the center pixel in the matrix, with a coefficient which is so adjusted that the overall coefficient of the filter is unity. An adder 22 adds up the results from the multipliers 20, 21 to produce the sum of the pixel of interest and the surrounding pixels, both multiplied by their assigned filter coefficients.

The space filter, as shown in FIG. 3, has a negative filter coefficient assigned for pixels adjoining the pixel of interest in the main and sub scan directions and a zero or negative filter coefficient assigned for pixels adjoining the pixel of interest in diagonal directions.

In such a conventional image signal processor, a scanner not shown feeds image information of text as multi-level signals of pixels to the input terminal. The input data is processed by the filter in the preprocessor 1 of FIG. 2. In this filter, the multi-level signals output from the latches 13, 14, 15, 16 are taken to be a, p, d, c. Of the multi-level signals at the output of the one-line buffer 11, a multi-level signal of a pixel adjoining the center pixel P one the side opposite to the scan direction is taken as b in FIG. 3. The pixel of interest P and the surrounding pixels a, b, c, d are multiplied by filter coefficients to amplify the high-frequency components in the main and sub scan directions to correct the fuzziness and sharpens the image.

The image signal subjected to the above preprocessing is entered into the adder 2. The adder 2 adds the output of the error filter 8 to the image signal thus entered. Then, the comparator 4 binarizes the output of the adder 2 according to the threshold value supplied by the threshold generator 3. The binary signal produced by the comparator 4 is fed to the output terminal 5. The subtractor 6 subtracts the output of the comparator 4 from the output of the adder 2 and stores the result as error data in the error data memory 7. The error filter 8 assigns weight of one-fourth to each of the error data (Error(a) to Error(d)) for the binarized signals of surrounding pixels a–d stored in the error data memory 7, and then sums up the weighted error data (Error(a) to Error(d)). The output of the error filter is added to the input image signal by the adder 2, as described earlier.

In this way, the error between the input image signal and the output image signal, which is the input image signal binarized, is scattered over the surrounding pixels to realize a halftone image reproduction with improved tone fidelity and increased resolution.

The above conventional image signal processor, however, has a drawback. When a photographic image with a screen of 133–150 lines arranged at a common screen angle of 45° is read in at the resolution of 4 line-pairs/mm and processed by the filter to sharpen the image, the image formed of multi-level signals from the filter has a conspicuous moire.

This is caused by the existence of a frequency component (133 lines: about 3.8 line-pairs/mm; 150 line: about 4.2 line-pairs/mm) on the screen image near a sampling frequency (4 line-pairs/mm).

Figure 4A:
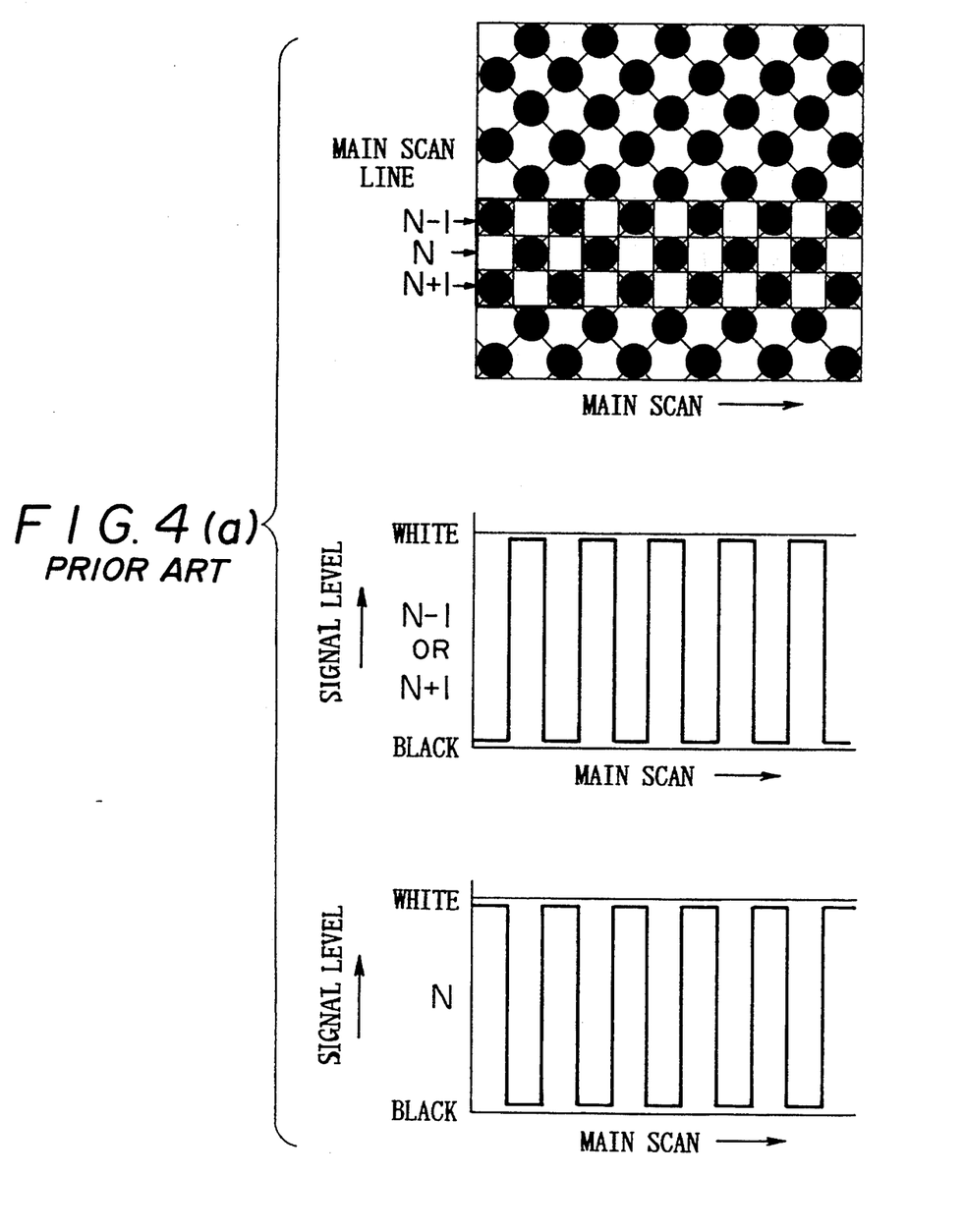
FIGS. 4(a)-(b) are diagrams showing the relationship between the sampling frequency used in reading an image and the frequency components of the screen image.
Figure 4B:
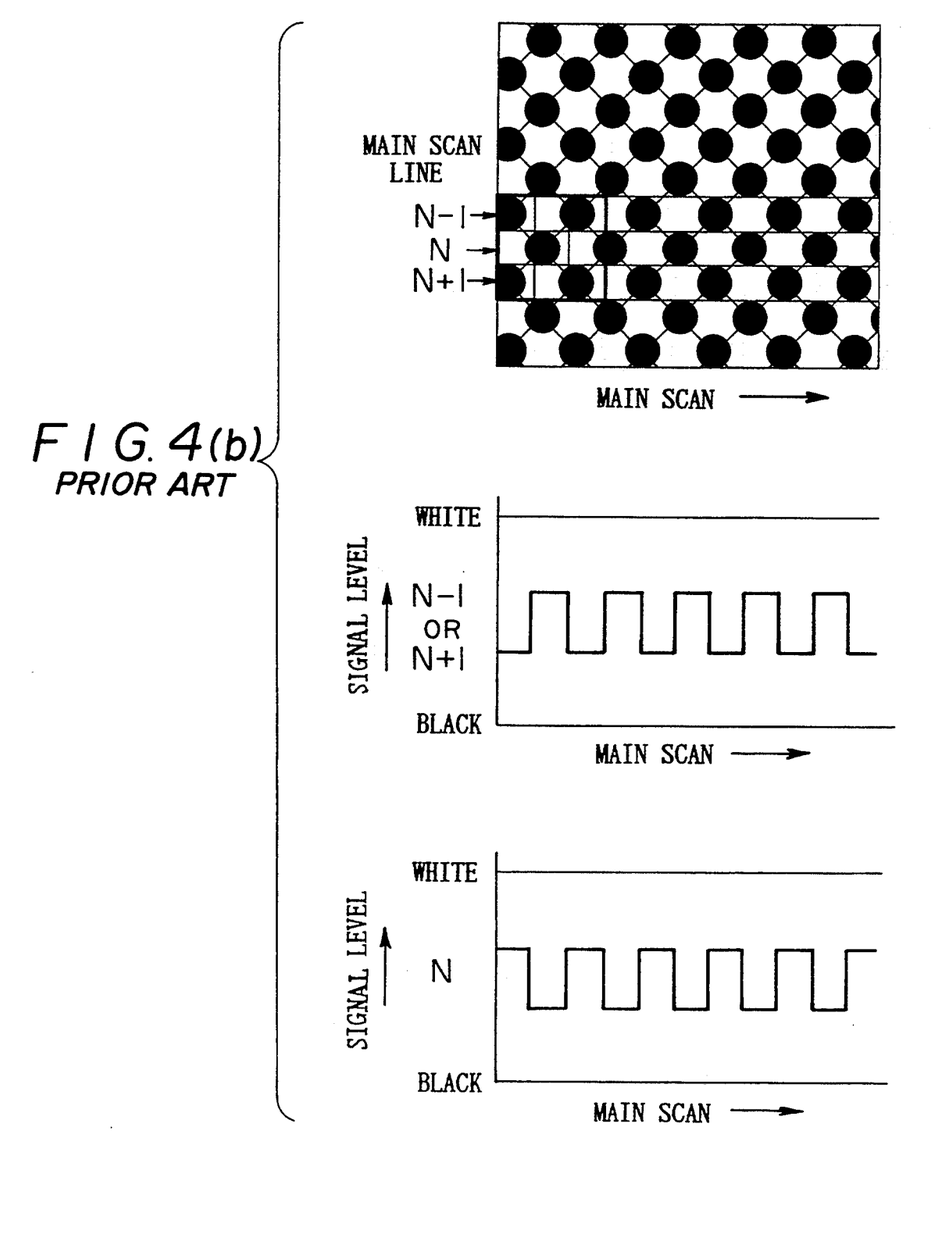

FIG. 4 shows the phase relationship between the sampling frequency used in reading or scanning and the screen image. Nine pixels enclosed in a thick box in the figure correspond to the pixels a–h, P in the spatial filter shown in FIG. 10.

At positions on the image formed of multi-level signals—which are entered, one pixel at a time, into the space filter—where the phase of the sampling frequency agrees with that of the screen image, as shown in FIG. 4(a), the image signal alternates to the extreme levels from one pixel to another. At positions where the phases do not coincide, as shown in FIG. 4(b), the image signal assumes an intermediate level according to the pattern of the screen. When the image signals supplied in these multiple levels are processed by the conventional Laplacean spatial filter, they are amplified, emphasizing the distinction between black and white at locations where the sampling phase and the screen image phase agrees as shown in FIG. 4(a).

At locations on the screen image where the phases do not agree as shown in FIG. 4(b), the nine pixels in the matrix of FIG. 3 produce less distinction between black and white, resulting in a halftone. The matching and mismatching between the sampling phase and the screen image phase result in an emphasized tone difference between the corresponding two areas, causing a marked moire in the filtered image.

Figure 5:
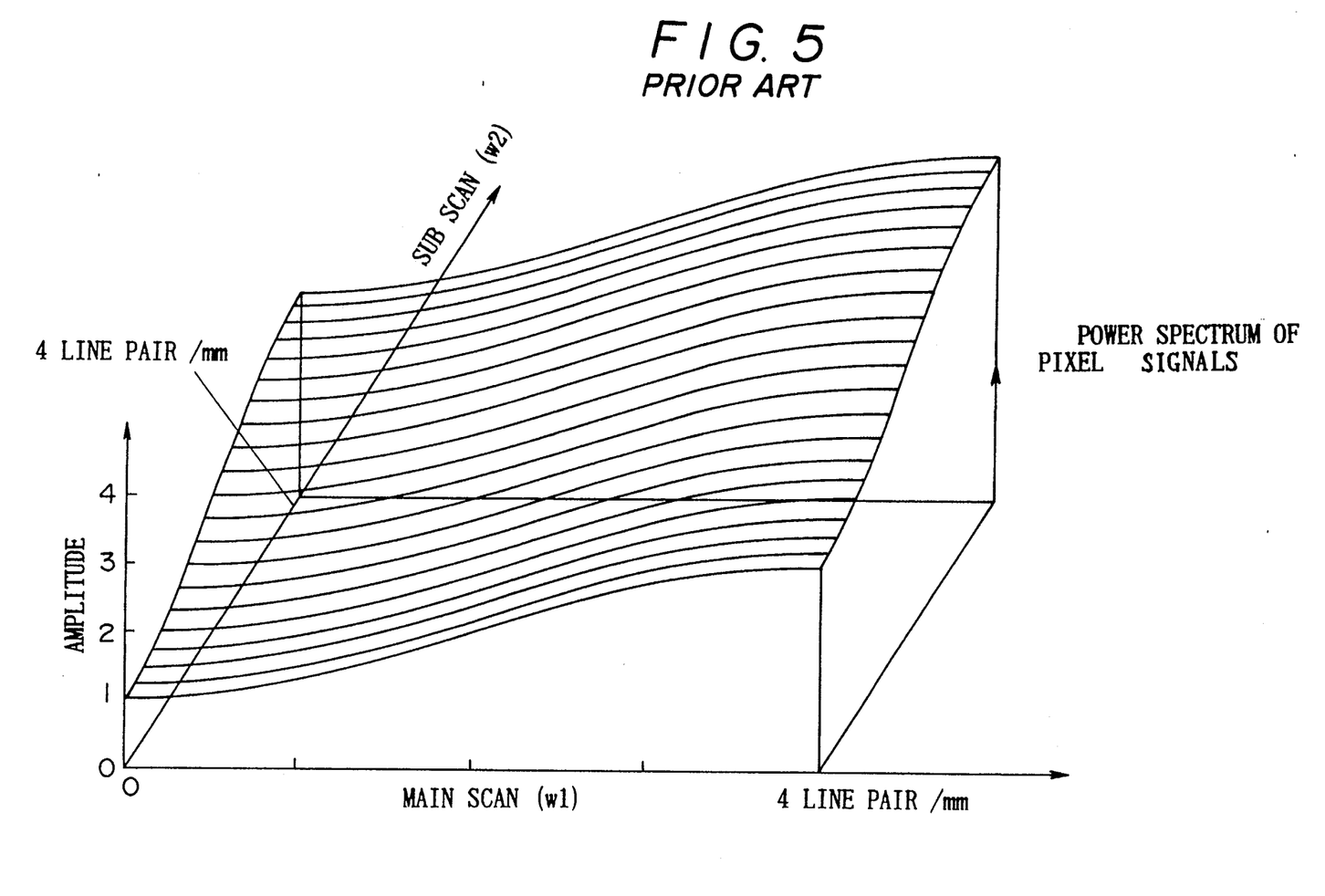
FIG. 5 is a diagram showing the spatial frequency-versus-amplitude characteristic of the conventional spatial filter.

In the conventional Laplacean filter the alternating pixel image signal is emphasized by the spatial frequency characteristic of the filter, which is shown in FIG. 5. FIG. 5 shows the amplitude characteristic of the spatial filter over a two-dimensional plane extending from the pixel of interest in the main and sub scan directions. As seen from the relationship, shown in FIG. 4, between the sampling frequency and the number of pixels, FIG. 5 illustrates the spatial frequency-versus-amplitude characteristic, which is obtained from the calculation of matrix made up of a pixel of interest and adjacent pixels. As shown in FIG. 5, the conventional Laplacean filter has a characteristic of amplifying high frequency components in the main and sub scan directions and at the same time amplifying to a greater extent high frequency components in diagonal directions. Hence, the pixel image signals most affected by this filter are the ones whose power spectra extend in the diagonal or 45° direction as in the case of FIG. 4(a), where the sampling frequency matches the frequency component of the screen. This produces a conspicuous moire.

The moire may be removed by taking an arithmetical mean of two adjacent pixels lined in the main scan direction to convert the pixel image signals into an average level during the preprocessing performed prior to the conventional Laplacean filter processing. The arithmetic mean operation, however, makes it impossible to provide sharp pixel images nor reproduce alternating line image such as a resolution pattern.

Further, in the conventional image signal processor, the operation of the circuits after the preprocessor 1 requires that the sum of the densities of multi-level image signals (Σfmn) should equal the sum of the densities of the binarized signals (Σgmn).

Figure 6A:
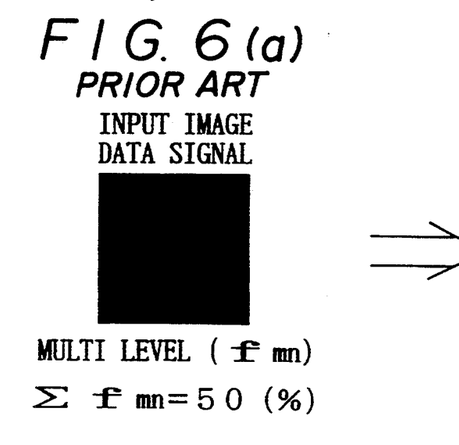
FIGS. 6(a)-(c) are diagrams showing a difference in density between the input image signals and the output image signals in the conventional image signal processor.
Figure 6B:
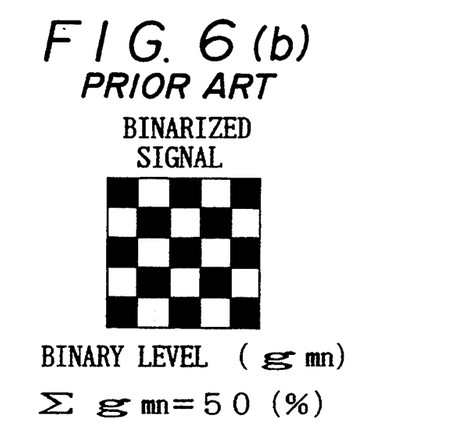
Figure 6C:
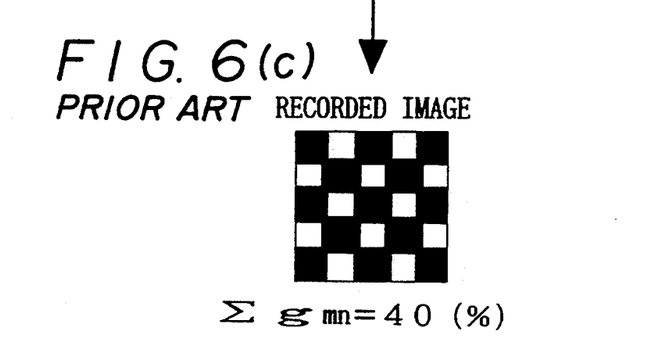

FIG. 6 shows the total of densities of the input image signals and that of the output image signals. FIG. 6(a) represents the input image signals that are received in the multiple levels. Let us assume that the black/white density in this area is 50%. FIG. 6(b) shows the binarized signals, which represent the theoretical output corresponding to the input image signals of FIG. 6(a). The total of the densities of the output image signals is 50%. FIG. 6(c) shows the result of output actually produced by the recording system based on the binarized signals of FIG. 6(b). The sum of the densities of the output image signals is 40%.

In this way, the dot size in the recording system that records a halftone image may become larger than a theoretical dot size (this phenomenon is referred to as thickening for convenience) or smaller (thinning). Such phenomena give rise to a problem of degraded tone fidelity in the image reproduction, including a reduced number of gradation levels that can be reproduced and a degraded tone continuity.

To solve this problem, it has been conceived to add to the apparatus a gamma convertor that performs density conversion to make the input image either darker or lighter before the image processing is carried out.

The apparatus with the additional gamma convertor, however, has another problem that the number of tone levels of the image signals output from the gamma convertor becomes smaller than that of the input image signals, making it impossible to fully compensate for the degraded tone fidelity in the reproduction of a halftone image. Although this problem can be solved by increasing the number of tone levels in the input image signal supplied to the gamma convertor (i.e., increasing the number of bits), an increase in the number of bits in the input image signal requires increasing the number of bits in the image signal processing unit arranged before the gamma convertor, giving rise to another problem of an increased volume of processing. There is still another problem. When the tone level of the input image signal is monotonously increased, the tone level of the output image signal also monotonously increases in the case of a theoretical dot. However, if the dot prints thicker or thinner than required, the tone level of the output image signal does not increase monotonously.

Figure 7A:
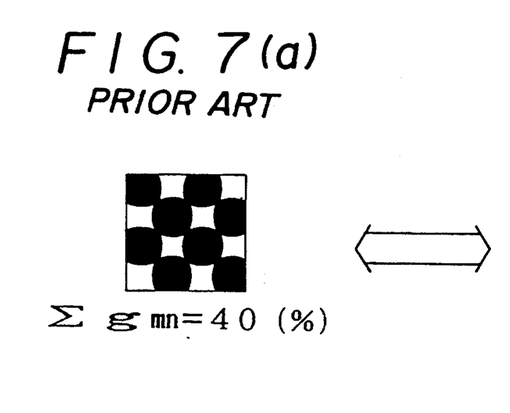
FIGS. 7(a)-(b) are diagrams showing a density difference resulting from a difference in the dot pattern in the conventional image signal processor.

FIG. 7 shows the sums of the output image signal densities for different printing patterns. FIG. 7(a) shows the condition that is identical to FIG. 6(c) and its total density is 40%. It is seen from FIGS. 6(b) and 6(c) that the theoretical density total of FIG. 7(a) is 50%.

Figure 7B:
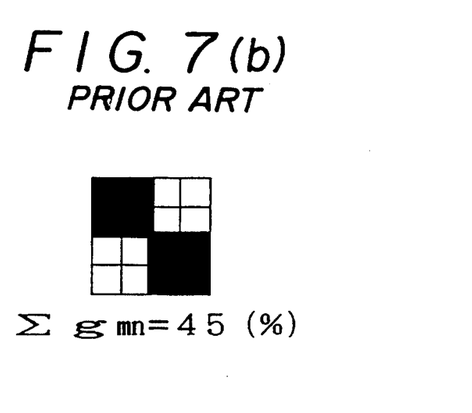

FIG. 7(b) shows another print pattern whose theoretical density total is also 50%. The real density, however, is 45% because of the difference in the printing pattern. This is the result of offset or mutual interference between the thickened or thinned adjacent recording dots.

This indicates that an increase in the tone level of the input image signal does not necessarily result in a monotonous increase in the tone level of the output image signal. Thus, fine correction by the gamma conversion is difficult and does not produce a satisfactory solution.

SUMMARY OF THE INVENTION

A first object of this invention is to provide an image signal processor that prevents moire from appearing on the image made up of multi-level pixel signals output from the filter during the process of sharpening the image.

A second object of the invention is to provide an image signal processor that can reproduce alternating line images while preventing the occurrence of moire.

A third object is to provide an image signal processor that, without increasing the number of input bits, can reproduce a smooth halftone image in a wide tonal range even with a recording system which prints thickened or thinned dots.

To achieve the above-mentioned objects, the image signal processor of this invention has a filter constructed in such a way that a filter coefficient for pixels adjoining a pixel of interest in the main and sub scan directions on the image made up of multi-level pixel signals is set to a positive value, that a filter coefficient for pixels adjoining the pixel of interest in diagonal directions is set to a negative value and that the sum of these coefficients including a filter coefficient for the pixel of interest is unity.

With this configuration, of the pixel image signals fed to the filter, those signals corresponding to the pixels adjoining the pixel of interest in the main and sub scan directions have their high frequency components amplified by the filter while those corresponding to pixels adjoining the pixel of interest in diagonal directions have their high frequency components attenuated. Hence, it is possible to eliminate moire from the pixel image signals that have power spectra in the diagonal 45° direction. Furthermore, since the high frequency components in the main and sub scan directions are amplified, it is possible to reproduce, emphasize and sharpen the line images.

For the purpose of realizing the third objective, the image signal processor of the invention comprises: an output image signal storage means for storing the output image signals which are binarized from the input image signals; a recording dot correction factor setting means for setting a difference between the theoretical dot size and the actual dot size produced by the recording system; and an error data correction means which receives the output of the output image signal storage means, the output of the recording dot correction factor setting means, and error data—which is the difference between the input image signal and the output image signal—to correct the error data.

With this configuration, the amount of correction is determined by using the black/white states of the pixel of interest and of the adjoining pixels, both output from the output image signal storage means, and also the correction factor set by the recording dot correction factor setting means. And the error data is corrected according to the amount of correction determined. The correction of error data is performed so that the sum of densities of input image signals in a localized area is equal to the sum of densities of output image signals. That is, $$\Sigma f_{mn} = \Sigma g_{mn}$$

This makes it possible to reproduce a halftone image with smooth gradation in a wide tonal range which is a precise representation of the overall density of input image signals, realizing a high-quality, reliable image signal processing.

These objects and features of this invention will become more apparent when one reads the following description of the preferred embodiment.

DETAILED DESCRIPTION OF PREFERRED EMBODIMENT

Figure 8:
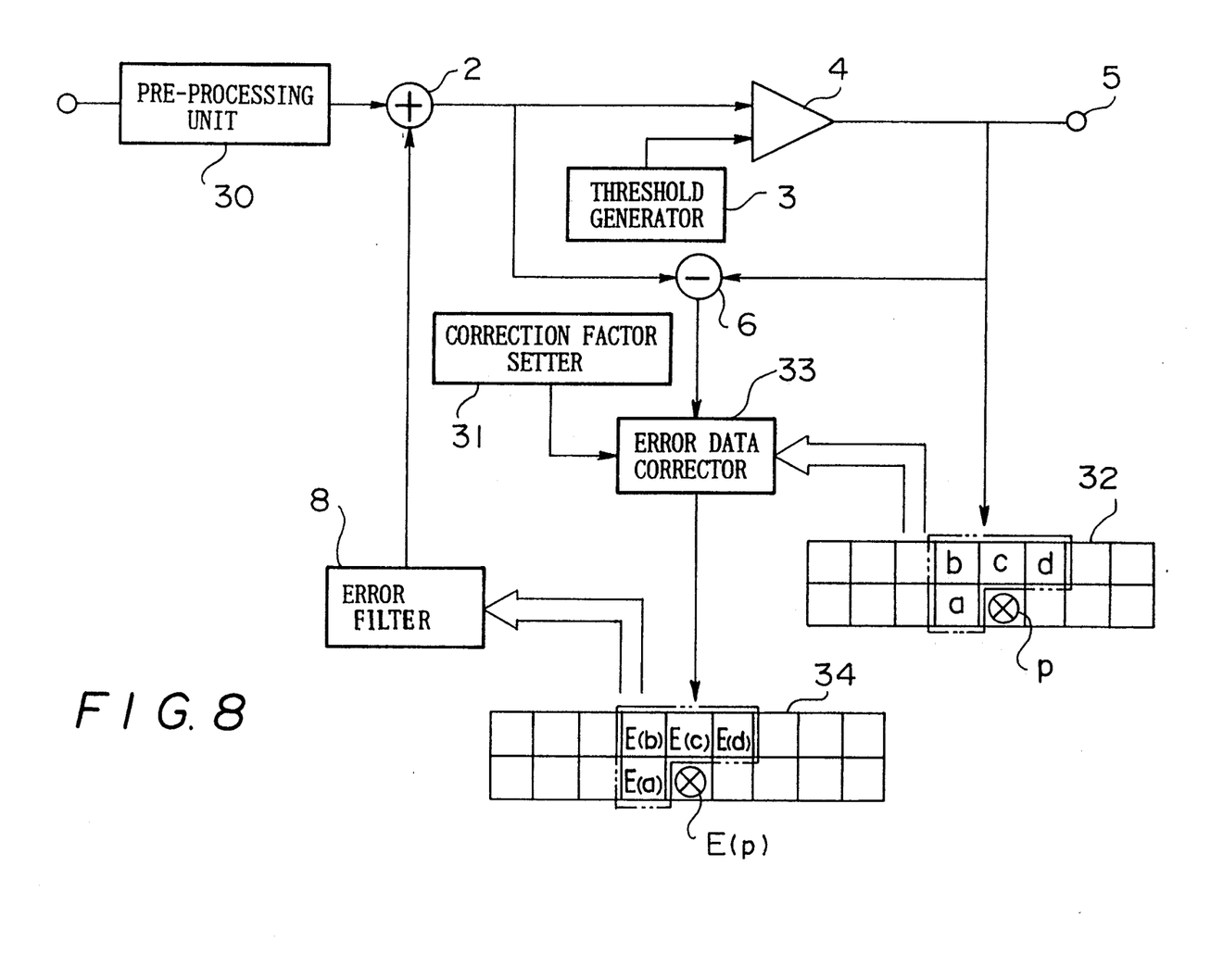
FIG. 8 is a block diagram showing the outline configuration of an image signal processor as one embodiment of this invention.

FIG. 8 shows the outline configuration of the image signal processor as one embodiment of this invention. In the figure, components with identical functions to those of the conventional processor are assigned the same reference numerals and their explanations are omitted. Reference numeral 30 represents a preprocessing unit made up of a spatial filter which performs preprocessing on the input image signals. Denoted 31 is a recording dot correction factor setter that sets a difference between the theoretical dot size and the actual dot size in the recording system. Designated 32 is an output image memory that stores two lines, in the main scan direction, of binarized pixel signals output from a comparator 4. Denoted 33 is an error data corrector that corrects the error data according to the output of the recording dot correction factor setter 31, the output of the output image memory 32, and the output of the subtractor 6. An error data memory 34 stores two lines, in the main scan direction, of corrected error data output from the error data corrector 33.

Figure 9:
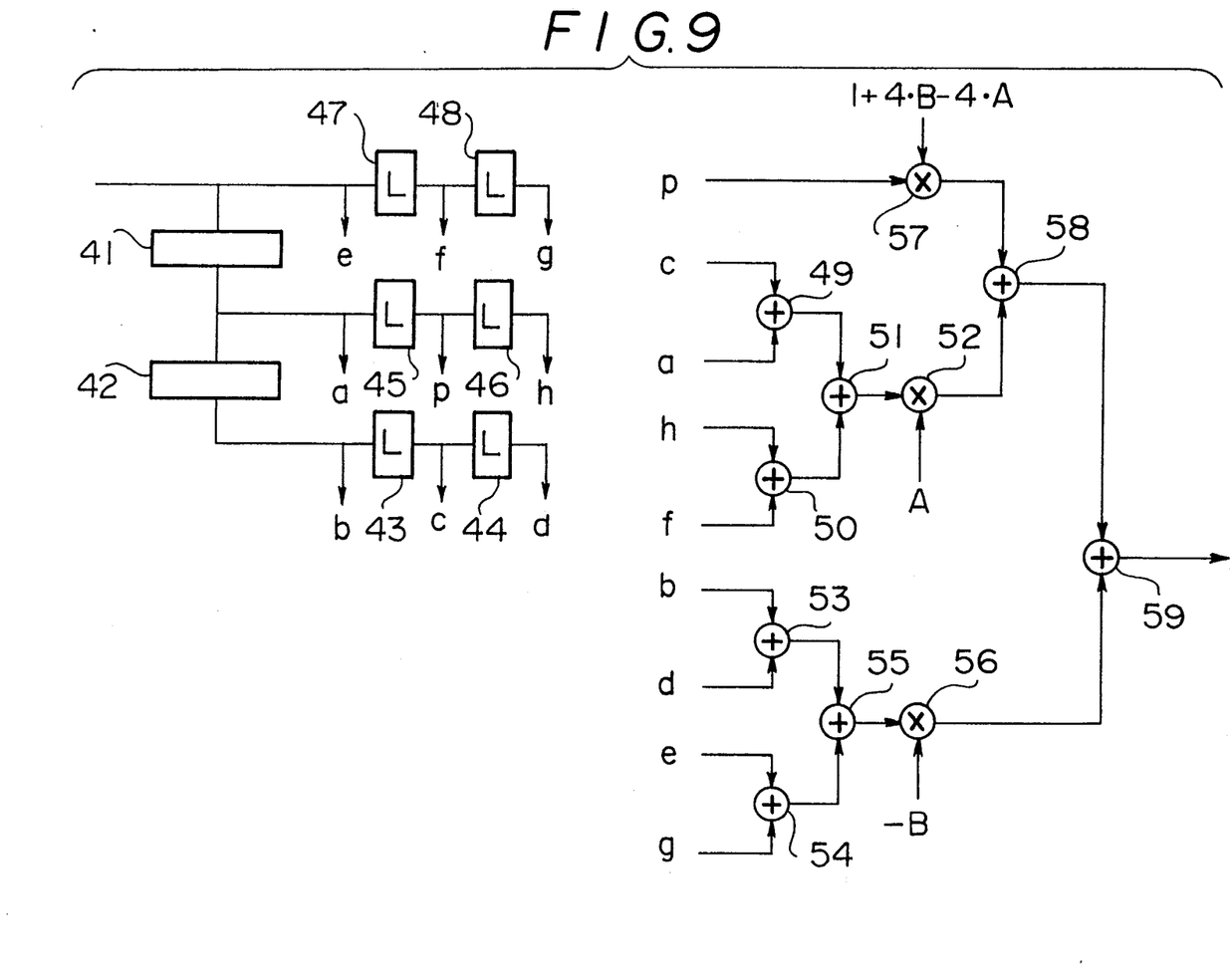
FIG. 9 is a diagram showing the outline configuration of a spatial filter used in the embodiment.

FIG. 9 shows an example circuit configuration of the spatial filter that makes up the preprocessing unit 30.

Figure 10:
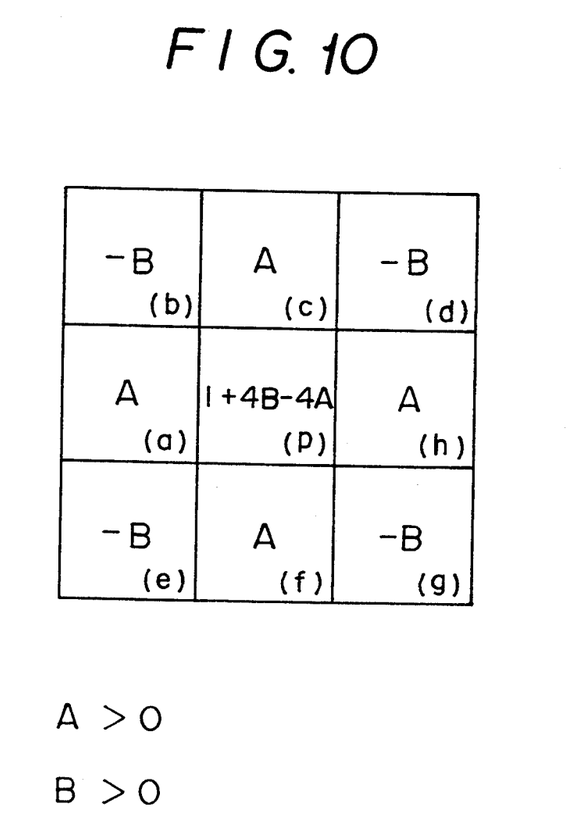
FIG. 10 is a diagram showing coefficients of the spatial filter.

FIG. 10 is a matrix diagram showing the spatial filter coefficients for 3×3 pixels. Pixels adjoining a center pixel of interest in the main and sub scan directions are assigned a positive filter coefficient A, and pixels adjoining the center pixel in diagonal directions are assigned a negative filter coefficient To make the overall filter coefficient unity, the center pixel of interest is given a coefficient of $1+4B-4A$.

In FIG. 9, denoted 41, 42 are 1-line buffers, of which the first 1-line buffer 41 accumulates the image signals one by one up to one line in the main scan direction, at which time the first 1-line buffer 41 shifts the whole one line of image signals into the second 1-line buffer 42 at a time. Designated 43, 44 are latch circuits that shift the image signals of one line stored in the 1-line buffer 42 one pixel at a time and generate pixel information about the pixels c, d in FIG. 10. Designated 45, 46 are latch circuits that, as with the above latch circuits, generates pixel information about the pixels P, h in FIG. 10 from the 1-line buffer Denoted 47, 48 are latch circuits that similarly generate pixel information about the pixel f, g in FIG. 10. Adders 49, 50, 51 add up pixel information of those pixels that adjoin the pixel P of interest in the main and sub scan directions. A multiplier 52 multiplies the result of the addition with a positive coefficient A. Adders 53, 54, 55 add up pixel information of those pixels that adjoin the pixel of interest P in diagonal directions. A multiplier 56 multiplies the result of this addition with a negative coefficient −B. A multiplier 57 multiplies the pixel information of the pixel of interest P with the coefficient 1+4B−4A, a coefficient to make the overall filter coefficient unity. Adders 58, 59 add up pixel information, that has been multiplied with respective coefficients by the multipliers.

Now, the operation of the spatial filter with the above configuration will be explained.

The image signal is entered from a scanner not shown into this filter. The first line of image information in the main scan direction is saved in the 1-line buffer When another line of image information is received, it is saved in the first 1-line buffer 41 after the information already contained in the line-line buffer 41 is shifted to the second 1-line buffer 42. This operation is repeated for each line received, generating the image signals for three lines at all times. Then the three lines of image signals are shifted one pixel at a time by the latch circuits 43–48 to generate an input image signal for each of the pixels in the 3×3 matrix of FIG. 10. These input image signals correspond to the pixels a–h, P in the matrix of FIG. 10.

As shown in FIG. 9, the multiplier 57 multiplies the pixel of interest p with the coefficient 1+4B−4A. And the adders 49, 50, 51 add up those pixels c, a, f, h adjoining the pixel of interest P in the main and sub scan directions. The multiplier 52 multiplies the result of the addition with a positive coefficient A. The adders 53, 54, 55 add up those pixels b, d, e, g adjoining the center pixel P in diagonal directions. And the multiplier 56 multiplies the result of this addition with a negative coefficient −B. The adders 58, 59 add up the results from the multipliers 57, 52, 56 to produce a filtered signal for the pixel of interest p. After this, the pixel of interest is shifted to the next pixel and the similar operation is carried out.

Figure 11:
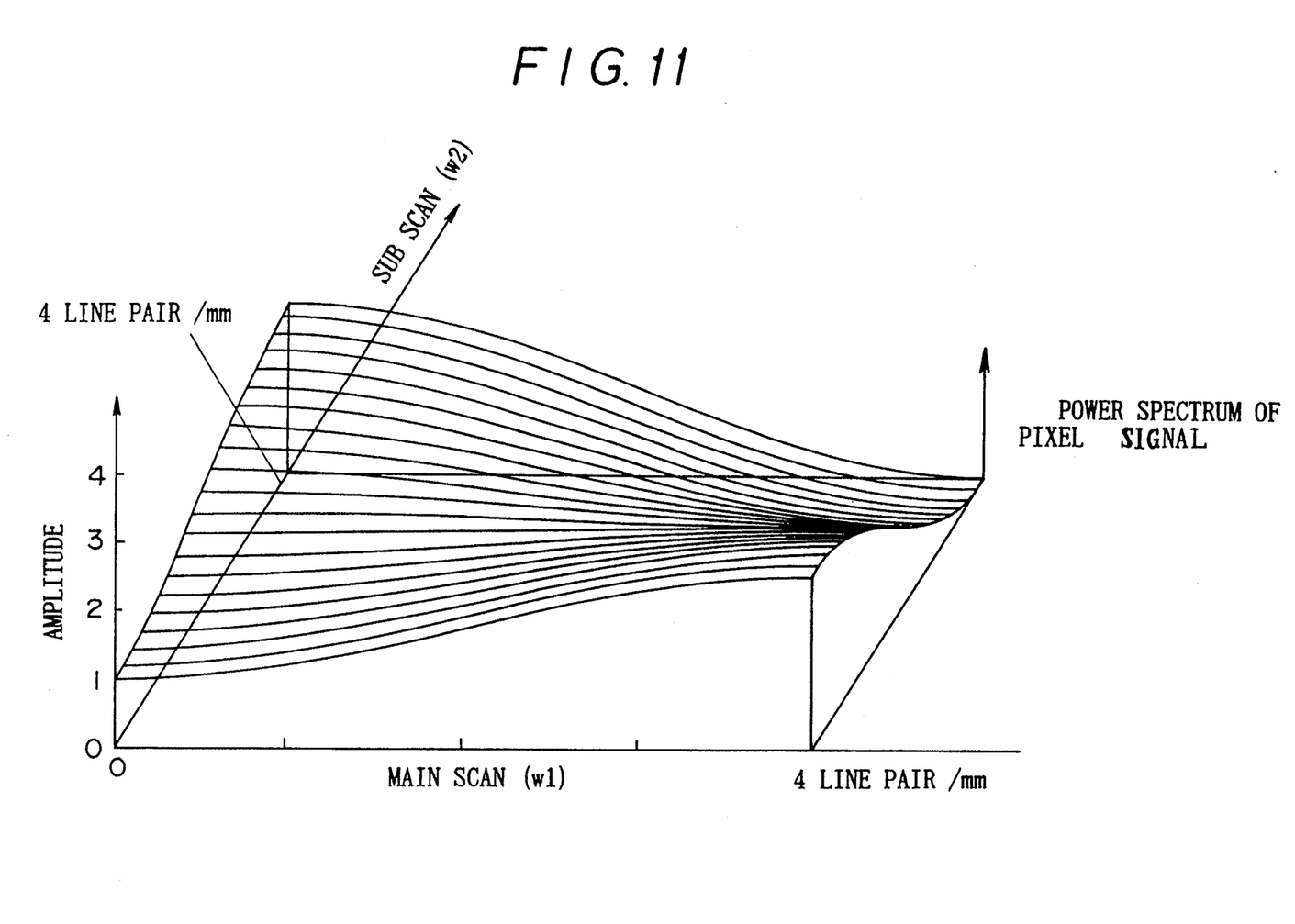
FIG. 11 is a diagram showing the spatial frequency-versus-amplitude characteristic of the spatial filter.

FIG. 11 shows the spatial frequency vs. amplitude characteristic in the image signal processor of this invention with A set to ⅛ and B to ¼. The figure shows the amplitude of the spatial filter with respect to a two-dimensional plane extending in the main and sub scan directions; in other words, it represents the amplitude characteristic for the pixel of interest and the adjoining pixels in the matrix of FIG. 10. When compared with FIG. 5 that indicates the amplitude characteristic of the conventional filter, it is noted that the amplitudes of pixels adjoining in the diagonal directions are minimal.

The frequency response in FIG. 11 can be given as a two-dimensional Fourier transform of the spatial filter coefficient h ($k_1$, $k_2$) and is expressed as $$H(e^{jw1}, e^{jw2})$$

$$= \sum_{k_1=-\infty}^{\infty} \sum_{k_2=-\infty}^{\infty} h(k_1, k_2) e^{-j \cdot w1 \cdot k1}, e^{-j \cdot w2 \cdot k2}$$

$$= 3/2 + 1/4 \cdot (\cos W_1) + 1/4 \cdot (\cos W_2) - \cos W_1 \cdot \cos W_2$$

The matrix coefficients used in FIG. 10 is shown in the table below.

| | | |
|---|---|---|
| h(−1, −1) = −1/4 | h(0, −1) = 1/8 | h(1, −1) = −1/4 |
| h(−1, 0) = 1/8 | h(0, 0) = 3/2 | h(1, 0) = 1/8 |
| h(−1, 1) = −1/4 | h(0, 1) = 1/8 | h(1, 1) = −1/4 |

In this way, this spatial filter attenuates the high frequency components of the pixel of interest in the diagonal directions and amplifies the high frequency components of the pixel in the main and sub scan directions, emphasizing the pixel image to produce a sharp and clear image.

While in the above description the image processing is started when the third line is read in the main scan direction, it is possible to start the image processing upon receiving the first line by registering two lines of artificial data along the main scan direction prior to receiving the image signal.

Where a scanner capable of reading three lines simultaneously is used or where the image data already stored in the page memory is processed, the line buffers may be omitted.

The image signal of the pixel of interest P preprocessed by the spatial filter in the preprocessing unit is entered into the adder 2. The adder 2 adds the output of the error filter 8 to this image signal. Then, the comparator 4 binarizes the output of the adder 2 according to the threshold value generated by the threshold generator 3 and outputs a binary result to the output terminal 5 and to the output image memory 32. The subtractor 6 subtracts the output of the comparator 4 from the output of the adder 2 to send the differential result as error data to the error data corrector 33.

Figure 12:
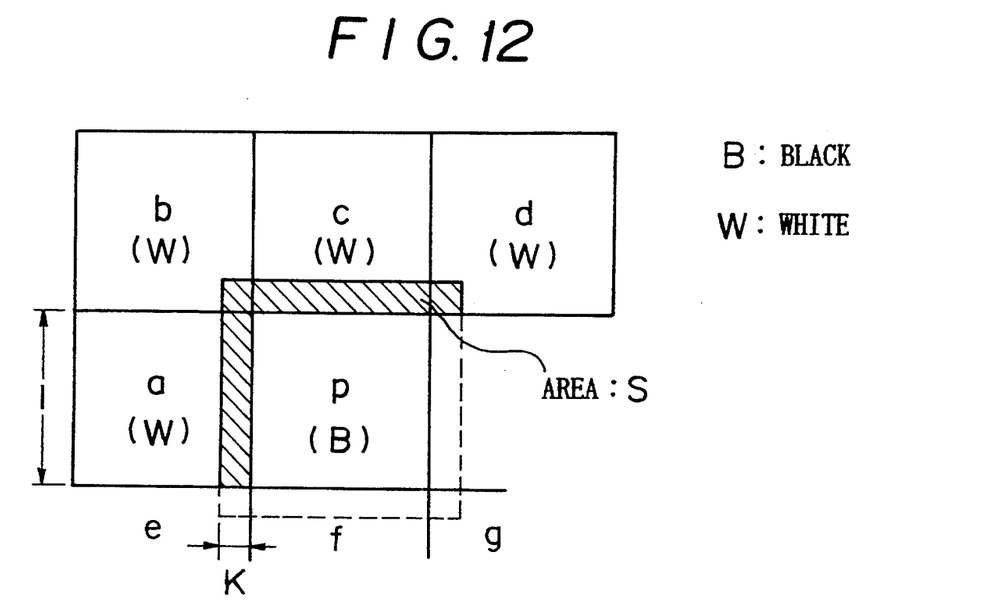
FIG. 12 is a diagram showing the binarization process performed in the embodiment when a pixel of interest is black with all adjoining pixels being white.

Next, the error data corrector 33 takes in the error data from the subtractor 6, a correction factor k from a recording dot correction factor setter 31, and output image signals of the adjoining pixels a, b, c, d in FIG. 12 from the output image memory 32 to correct the error data for the pixel of interest P. The correction factor k is determined based on the difference in size between the actual dot in the recording system and the theoretical dot and is preset in the recording dot correction factor setter 31 according to the size of the dot produced by the recording system. The error data corrected by the corrector 33 is stored in the error data memory 34. The error filter 8 assigns weights to and adds up the binarized error data Error(a), Error(b), Error(c), Error(d) for the adjoining pixels stored in the error data memory 34. The result of the weighted addition is sent to the adder 2 where it is added to the input image signal of the pixel of interest P, as shown in FIG. 8.

The outline of operation as performed by the image signal processor of the invention has been described. The operation of the error data corrector 33 will be explained in more detail.

As a first example of operation, let us consider a case where the pixel of interest is black and the adjacent pixels are all white as shown in FIG. 12. In the figure, the shaded area represents a portion of the actual black dot produced that has protruded from the theoretical black dot boundary into the adjoining white dot areas. The correction on an area marked by a dashed line is performed during the correction process of the adjoining pixels e, f, g, h. The correction processing conforms to Table 1 and Table 2 shown later. If we let the width of the overflow region in FIG. 12 be k (the correction factor described earlier) and the width of a theoretical dot be 1, then the area S of the shaded portion is given by $$S = 2k + 2k^2$$

Let W stand for the signal level of the white input image signal. Then the amount of correction C is expressed as $$C = (2k + 2k^2) \times W$$

If the error data is $e_{mn}$, the corrected error data $e'_{mn}$ is given by $$e'_{mn} = e_{mn} + (2k + 2k^2) \times W$$

Figure 13:
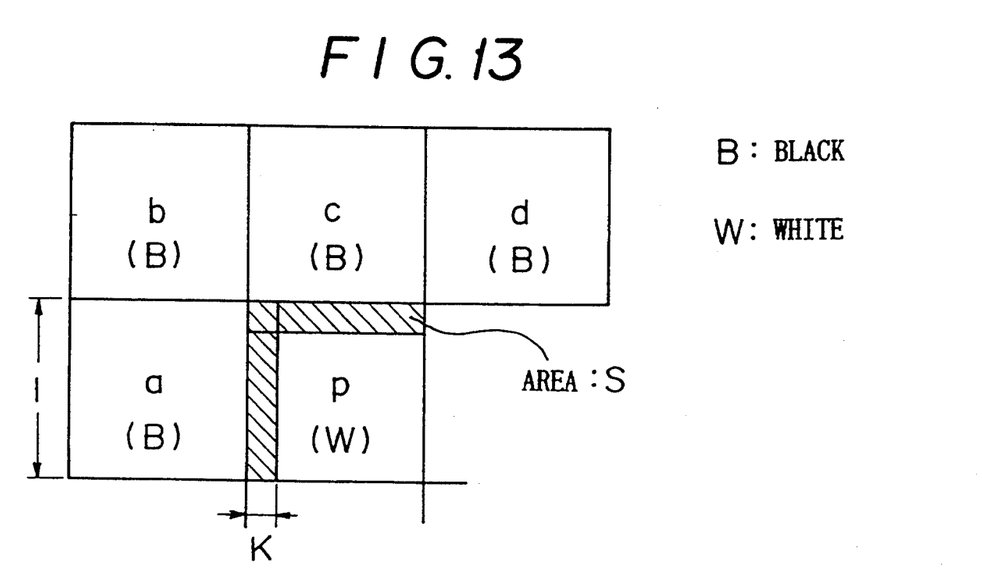
FIG. 13 is a diagram showing the binarization process performed in the embodiment when a pixel of interest is white with all adjoining pixels being black.

Next, as a second example of operation, let us consider a case where the pixel of interest is white and the adjoining pixels are all black. In the figure, the shaded area represents a part of the theoretical white dot that is missing from the actual white dot. As in the first operation example, the area of the shaded portion S is given by $$S = 2k - k^2$$

Assuming the signal level of the white input image signal to be W, the amount of correction C is defined as $$C = (2k - k^2) \times W$$

If the error data is $e_{mn}$, then the corrected error data $e'_{mn}$ is expressed as $$e'_{mn} = e_{mn} + (3k - k^2) \times W$$

Likewise, for all white/black combinations of the pixel of interest P and the adjoining pixels a, b, c, d, the amount of corrections C can be determined. If we let $e_{mn}$ stand for the error data for any arbitrary correction value C, the corrected error data $e'_{mn}$ is expressed generally as $$e'_{mn} = e_{mn} + C$$

Table 1 shows the correction values C when the pixel of interest P is black and Table 2 shows the correction values C when it is white.

TABLE 1

| Pixel of interest | Adjoining pixels | | | | Amount of correction |
|---|---|---|---|---|---|
| P | a | b | c | d | C |
| 0 | 0 | 0 | 0 | 0 | 0 |
| 0 | 0 | 0 | 0 | 1 | 0 |
| 0 | 0 | 0 | 1 | 0 | W × (k − 2k²) |
| 0 | 0 | 0 | 1 | 1 | W × (k) |
| 0 | 0 | 1 | 0 | 0 | 0 |
| 0 | 0 | 1 | 0 | 1 | 0 |
| 0 | 0 | 1 | 1 | 0 | W × (k − 2k²) |
| 0 | 0 | 1 | 1 | 1 | W × (k) |
| 0 | 1 | 0 | 0 | 0 | W × (k − k²) |
| 0 | 1 | 0 | 0 | 1 | W × (k − k²) |
| 0 | 1 | 0 | 1 | 0 | W × (2k − 3k²) |
| 0 | 1 | 0 | 1 | 1 | W × (2k − k²) |
| 0 | 1 | 1 | 0 | 0 | W × (k − k²) |
| 0 | 1 | 1 | 0 | 1 | W × (k − k²) |
| 0 | 1 | 1 | 1 | 0 | W × (2k) |
| 0 | 1 | 1 | 1 | 1 | W × (2k + 2k²) |

NOTE:
W represents the signal level of a white input image signal. 1 indicates white and 0 indicates black.

TABLE 2

| Pixel of interest | Adjoining pixels | | | | Amount of correction |
|---|---|---|---|---|---|
| P | a | b | c | d | C |
| 1 | 0 | 0 | 0 | 0 | W × (2k − k²) |
| 1 | 0 | 0 | 0 | 1 | W × (2k − k²) |
| 1 | 0 | 0 | 1 | 0 | W × (k + k²) |
| 1 | 0 | 0 | 1 | 1 | W × (k) |
| 1 | 0 | 1 | 0 | 0 | W × (2k − k²) |
| 1 | 0 | 1 | 0 | 1 | W × (2k − k²) |
| 1 | 0 | 1 | 1 | 0 | W × (k + k²) |

TABLE 2-continued

| Pixel of interest | Adjoining pixels | | | | Amount of correction |
|---|---|---|---|---|---|
| P | a | b | c | d | C |
| 1 | 0 | 1 | 1 | 1 | W × (k) |
| 1 | 1 | 0 | 0 | 0 | W × (k) |
| 1 | 1 | 0 | 0 | 1 | W × (k) |
| 1 | 1 | 0 | 1 | 0 | W × (2k²) |
| 1 | 1 | 0 | 1 | 1 | W × (k²) |
| 1 | 1 | 1 | 0 | 0 | W × (k) |
| 1 | 1 | 1 | 0 | 1 | W × (k) |
| 1 | 1 | 1 | 1 | 0 | W × (k²) |
| 1 | 1 | 1 | 1 | 1 | 0 |

NOTE:
W represents the signal level of a white input image signal. 1 indicates white and 0 indicates black.

Referring to these tables, the operation of the error data corrector 33 will be explained.

The error data corrector 33 receives the error data $e_{mn}$ for the pixel of interest P from the subtractor 6. At the same time, the error data corrector 33 also takes in the correction factor k from the recording dot correction factor setter 31 and a 5-bit signal from the output image memory that indicates whether the pixel of interest P and the adjoining pixels a, b, c, d are white (1) or black (0).

Next, the error data corrector 33 determines the correction value C by referencing the 5-bit signal to Table 1 and Table 2, and then adds the correction value C and the error data emn to obtain the corrected error data $e'_{mn}$.

The advantages of this embodiment may be summarized as follows.

The image signal processor of the invention consists of: an output image signal storing means that stores output image signals; a recording dot correction factor setting means that sets a difference between the real dot size produced in the recording system and the theoretical dot size; and an error data correction means that receives the output of the output image signal storing means, the output of the recording dot correction factor setting means, and error data which is a difference between the input image signal and the output image signal, to correct the error data. This image signal processor enables a precise correction of the error data by using the black/white status signal for the pixel of interest and the adjoining pixels from the output image memory and the correction factor k from the recording dot correction factor setting means. This in turn makes it possible to equalize the sum of the densities of input image signals over a specified localized area to the sum of the densities of output image signals, thus reproducing a halftone image with a smooth gradation in a wide tonal range.

While in this embodiment the thickened dot is modeled as a square, it may be modeled as a circle. Since the diagonally adjacent pixels (b, d in FIG. 12) relative to the pixel of interest have relatively small influences, it is possible to reference only the pixels adjoining the pixel of interest in the main and sub scan directions (a, c in FIG. 12) in order to reduce the amount of processing performed. The precision of the image signal processing can further be enhanced by improving the calculation formula used by the error filter.

Although in the above embodiment the image signal level correction is applied to the thickened dots that would occur in such printing system as a laser beam printer, it can also be used for correcting the thinned dots that may occur in a thermal printing system depending on the direction of scanning.

Moreover, while the image signal processing in this embodiment has been described as requiring the first line of data in the main and sub scan directions as the reference data, artificial data may instead be registered to enable the image signal processing to start with the first pixel scanned.

Although the present invention has been described by referring to the attached drawings in relation to the embodiments shown therein, various modifications may be made by those skilled in the art without departing the spirit of the present invention.

What is claimed is:

1. A spatial filter of an image signal processor for preprocessing image signals Sd, Sc, Sb, Sh, Sp, Sa, Sg, Sf and Se of pixels sampled in that order in alternating line images to prevent moire from occurring, comprising:

first and second 1-line buffer memories arranged in series for respectively storing a group of image signals of pixels which are arranged in a line directed in a main scan direction, a group of image signals of a line stored in the first 1-line buffer memory being transferred to the second 1-line buffer memory each time another group of image signals of another line is transferred to the first 1-line buffer memory, the image signals Sb, Sc, Sd of pixels arranged in a first line being stored in the second 1-line buffer memory as pieces of pixel information Ib, Ic, Id, and the image signals Sa, Sp, Sh of pixels arranged in a second line being stored in the first 1-line buffer memory as pieces of pixel information Ia, Ip, Ih;

first and second latch circuits for respectively latching one of the pixel information stored in the second 1-line buffer memory, a piece of pixel information stored in the first latch circuit being transferred to the second latch circuit each time another piece of pixel information is transferred to the first latch circuit, the pixel information Ic being stored in the first latch circuit, and the pixel information Id being stored in the second latch circuit;

third and fourth latch circuits for respectively latching one of the pixel information stored in the first 1-line buffer memory, a piece of pixel information stored in the third latch circuit being transferred to the fourth latch circuit each time another piece of pixel information is transferred to the third latch circuit, the pixel information Ip of a pixel of interest being stored in the third latch circuit, and the pixel information Ih being stored in the fourth latch circuit;

fifth and sixth latch circuits for respectively latching one of the image signals of pixels arranged in a third line, an image signal stored in the fifth latch circuit being transferred to the sixth latch circuit each time another image signal is transferred to the fifth latch circuit, the image signal Sf being stored in the fifth latch circuit as a piece of pixel information If, and the image signal Sg being stored in the sixth latch circuit as a piece of pixel information Ig;

first adding means for adding the pixel information Ia, Ih of pixels adjoining the pixel of interest in the main scan direction to obtain a first information sum, and the pixel information Ic, If of pixels adjoining the pixel of interest in a sub scan direction perpendicular to the main scan direction, the pixel information Ia being output from the first 1-line buffer, the pixel information Ih being output from the fourth latch circuit, the pixel information Ic being output from the first latch circuit, and the pixel information If being output from the fifth latch circuit;

second adding means for adding the pixel information Ib, Id, Ig and the image signal Se of pixels adjoining the pixel of interest in diagonal directions to obtain a second information sum, the pixel information Ib being output from the second 1-line buffer, the pixel information Id being output from the second latch circuit, the image signal Se being sent through a signal line in a last order to be treated as a piece of pixel information Ie, and the pixel information Ig being output from the sixth latch circuit;

a first multiplier for multiplying the first information sum obtained in the first adding means with a first filter coefficient A to obtain a first multiplied sum;

a second multiplier for multiplying the second information sum obtained in the second adding means with a second filter coefficient $-B$ to obtain a second multiplied sum;

a third multiplier for multiplying the pixel information Ip of the pixel of interest with a third filter coefficient C to obtain a third multiplied sum; and third adding means for adding the first multiplied sum obtained in the first multiplied, the second multiplied sum obtained in the second multiplier and the third multiplied sum obtained in the third multiplier to obtain a result of a preprocessing of the image signals Sd, Sc, Sb, Sh, Sp, Sa, Sg, Sf and Se.

2. A spatial filter according to claim 1 in which a weighted sum $4A-4B+C$ of the first, second and third filter coefficient A, B, C with which the pixel information Id, Ic, Ib, Ih, Ip, Ia, Ig, If and Ie are multiplied is unity.

3. A spatial filter according to claim 1 in which the first filter coefficient A is positive.

4. A spatial filter according to claim 1 in which the first filter coefficient A is equal to $\frac{1}{8}$.

5. A spatial filter according to claim 1 in which the second filter coefficient B is negative or zero.

6. A spatial filter according to claim 2 in which the first filter coefficient A is equal to $\frac{1}{8}$, and the second filter coefficient B is negative.

* * * * *